United States Patent [19]

Boone et al.

[11] 4,352,952

[45] Oct. 5, 1982

[54] DATA SECURITY MODULE

[75] Inventors: Charles A. Boone, Mesa; Robert F. Pfeifer, Phoenix, both of Ariz.

[73] Assignee: Motorola Inc., Schaumburg, Ill.

[21] Appl. No.: 126,808

[22] Filed: Mar. 3, 1980

Related U.S. Application Data

[63] Continuation of Ser. No. 914,832, Jun. 12, 1978, abandoned.

[51] Int. Cl.³ .............................................. H04L 9/00
[52] U.S. Cl. .................................. 178/22.09; 364/200
[58] Field of Search ............................ 178/22, 22.09; 340/149 A, 149 R, 152 R; 364/200

[56] References Cited

U.S. PATENT DOCUMENTS

| 3,302,182 | 1/1967 | Lynch et al. | 178/22.09 |
| 3,956,615 | 5/1976 | Anderson et al. | 178/22.09 |
| 4,120,030 | 10/1978 | Johnstone | 178/22.09 |
| 4,168,396 | 9/1979 | Best | 178/22.09 |
| 4,203,166 | 5/1980 | Ehrsam et al. | 178/22.09 |

OTHER PUBLICATIONS

"Hard Node-Hardened Protection for Computational Cryptography", Computation Planning, Inc., Bethesda, Md. 20014; 3/28/77.

"System Implications of Information Privacy", Petersen et al., Spring Joint Computer Conference 1967, pp. 291-300.

"Security Considerations in a Multi-Programmed Computer System", Peters, Spring Joint Computer Conference 1967, pp. 283-286.

"Some Cryptographic Techniques for Machine to Machine Data Communications", Feistel, Proceedings of the IEEE, vol. 63, No. 11, Nov. 1975, pp. 1545-1554.

Primary Examiner—Howard A. Birmiel
Attorney, Agent, or Firm—M. David Shapiro; Eugene A. Parsons

[57] ABSTRACT

A data security module for encrypting and decrypting computer data contains, in addition to the encryption logic, interface logic to allow direct memory access to a computer. The security module sits as a computer peripheral device and after being instructed as to the location and quantity of data by the computer, accesses the data directly from the computer memory without disturbing the processor to provide parallel encryption or decryption of computer memory data.

1 Claim, 13 Drawing Figures

PRIOR ART

Fig. 1A

PRIOR ART

| FIG.4A | FIG.4B | FIG.4C | FIG.4D |
| FIG.4E | FIG.4F | FIG.4G | FIG.4H |

Fig. 4A

DATA SECURITY MODULE

This is a continuation of application Ser. No. 914,832, filed June 12, 1978, now abandoned.

BACKGROUND OF THE INVENTION

This invention relates to data security systems, and more particularly, to data security systems interfacing with computers.

The encryption of digital data has been widely recognized as a need in the computer industry in order to protect data which is transmitted over unsecure data transmission paths. A standard data encryption algorithm has been proposed by the National Bureau of Standards as described in the Federal Information Processing Standard Publication 46 and available through the National Technical Information Service.

Various systems have been used in the past to implement this or similar algorithms. The principle methods being either software implementation of the algorithm which utilizes the central processor of the computer, or a serial encryption device which encrypts or decrypts data either just before it enters the computer or just after it exits from the computer. However these systems have several undesirable effects in that they reduce the data transfer time in the case of the serial devices and tie up the central processor in the case of the software implementation. Moreover the software implementation is relatively time consuming.

Therefore it can be appreciated that a data encryption system which does not interfere with the direct flow of data and does not tie up the central processor for an extended period of time is highly desirable.

SUMMARY OF THE INVENTION

Therefore it is an object of this invention to provide a data encryption module which encrypts data in a parallel rather than serial flow.

It is also an object of this invention to provide a data encryption module which operates with minimum central processor attention.

it is still another object of this invention to provide a data security module which operates in a peripheral slot of a standard computer.

It is an object of this invention to provide a data security module which is capable of direct access to the memory of a computer.

An illustrated embodiment of the invention provides a data security module for use as a computer peripheral which comprises circuitry for encrypting and decrypting data words in response to a computer command, and computer interaction means for accessing directly memory words of a computer for encrypting and decrypting data in a memory of said computer while permitting a central processor of said computer to perform other functions.

DESCRIPTION OF THE PREFERRED EMBODIMENT

Figure 1A:
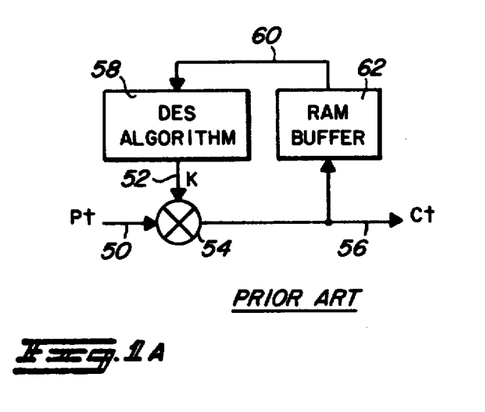
FIGS. 1a and b are a block diagram of cipher feedback (CFB) data flow.

Now referring to FIG. 1, the cipher feedback (CFB) encryption and decryption data flow is shown for reference to provide a better understanding of the function performed by the data security module. FIG. 1a shows a CFB encipher data flow wherein plain text data enters on line 50, and is combined with the key text appearing on line 52 at an exclusive OR gate 54. The output on line 56 is a ciphered text data. The key on line 52 is generated using the National Bureau of Standards Data Encryption Standard (DES) algorithm embodied in block 58. The DES algorithm utilizes a key of 64 bits of which 56 are actually used, the other eight bits are used for parity, and 64 bits of input data are stored in a RAM buffer 62. The 64 bits of input data are transferred into the DES algorithm 58 on a data line 60 from RAM buffer 62.

Figure 1B:
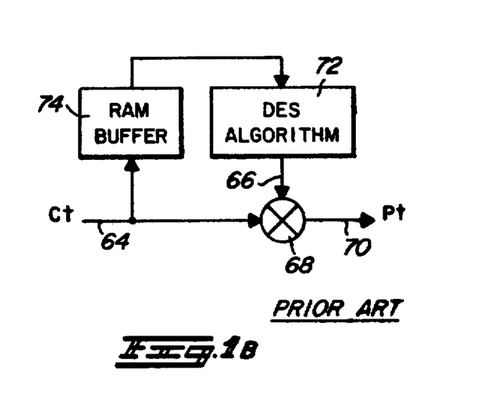

In FIG. 1b the ciphered text is deciphered. The ciphered text appears at line 64 and is exclusive ORed with the key test on line 66 by exclusive OR gate 68 to produce a plain text output on line 70. The key used by the DES algorithm device 72 must be identical to the key used in DES algorithm device 58 of FIG. 1a. Also the RAM buffer 74 of FIG. 1b is identical to RAM buffer 62 of FIG. 1a. Thus the encipher and decipher flow diagrams of FIG. 1a and FIG. 1b are essentially mirror images of each other. Information on cipher feedback can be found in Federal Standard 1026, written by the Federal Telecommunications Standards Committee and available from the General Services Administration, Building 197, Washington, D.C.

Figure 2:
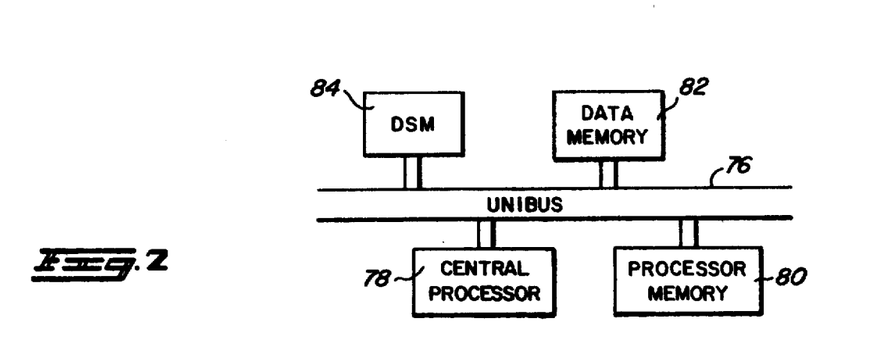
FIG. 2 is a block diagram of a computer with a data security module in place.

A typical memory block diagram of a computer incorporating the data security module is shown in FIG. 2. In a preferred embodiment of the invention the data security module is used in conjunction with a PDP-11 computer and connects directly to the Unibus of the PDP-11. PDP 11 and Unibus are trade marks of Digital Equipment Corporation. In FIG. 2 the Unibus 76 has the main computer elements connected to it. Among these elements is a central processor 78, a processor memory 80 generally used for holding instructions for the memory, and a data memory 82 for holding general computer data. Added to the Unibus is a data security module shown as block 84. As is well known by those skilled in the art the PDP-11 and the Unibus concept allows peripheral devices (under a priority structure) to operate in a direct memory access mode wherein a peripheral may take control of the Unibus and talk directly with any other device situated on the Unibus and thus allow direct contact between devices on the Unibus. Thus the Unibus is time shared allowing several parallel operations to occur in the peripheral element at the same time and each gaining control and use of the Unibus as necessary.

Figure 3:
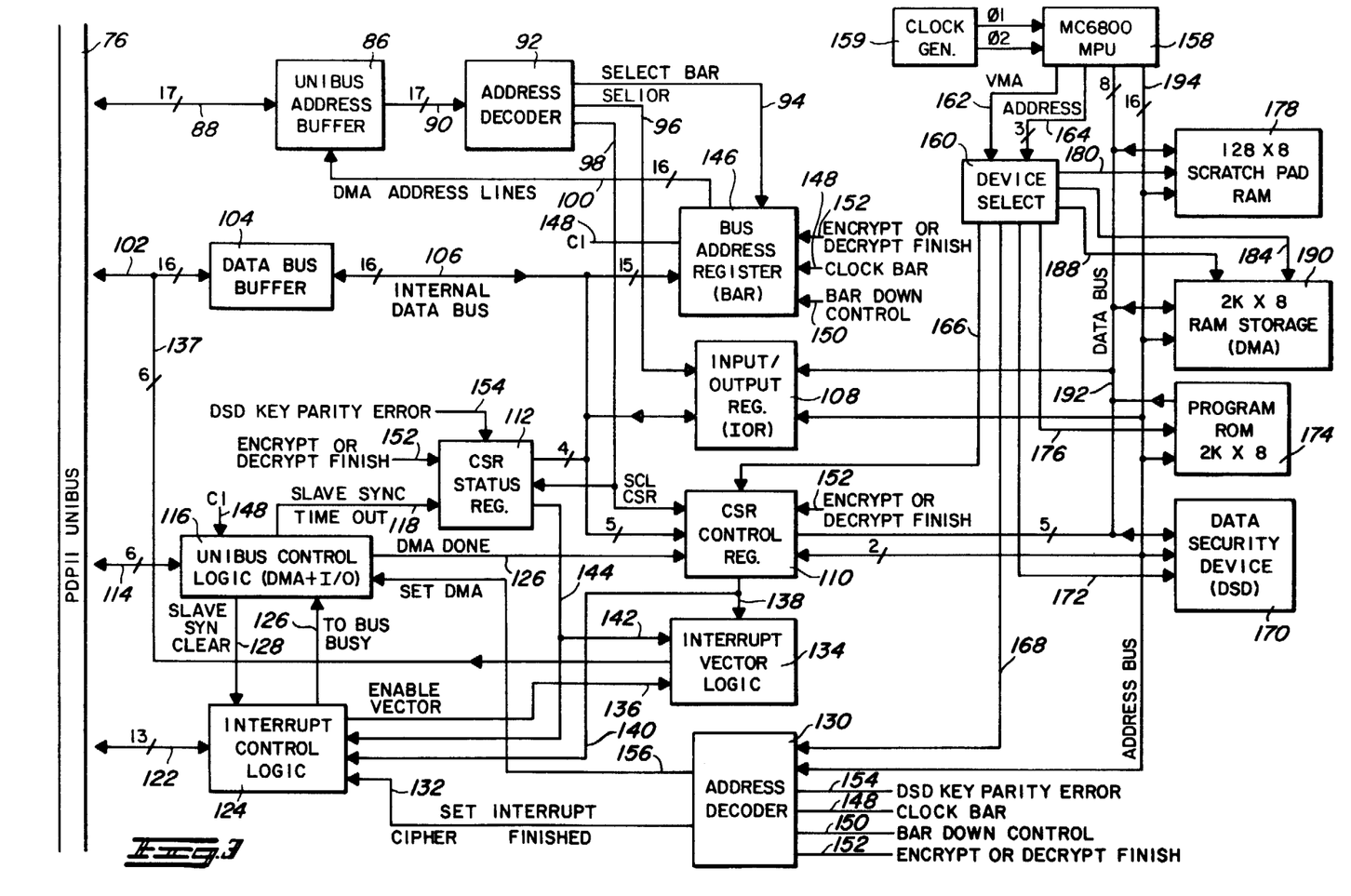
FIG. 3 is a block diagram of a data security module.
Figure 4:
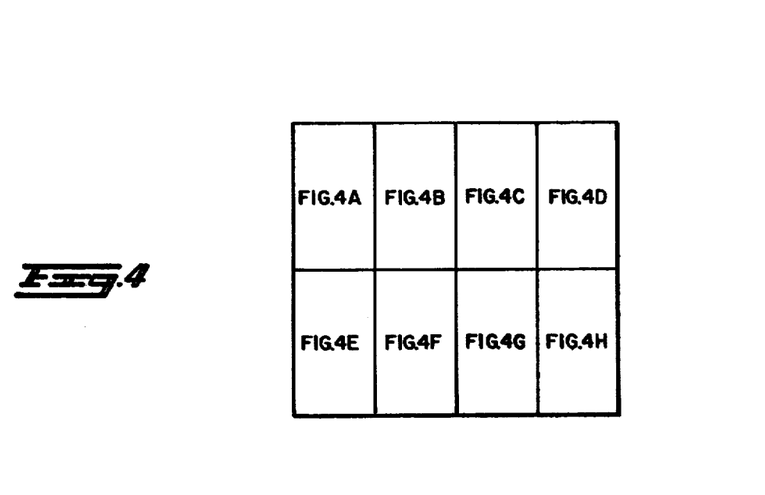
FIGS. 4 and 4a-4h are a detailed schematic of the data security module.
Figure 4A:
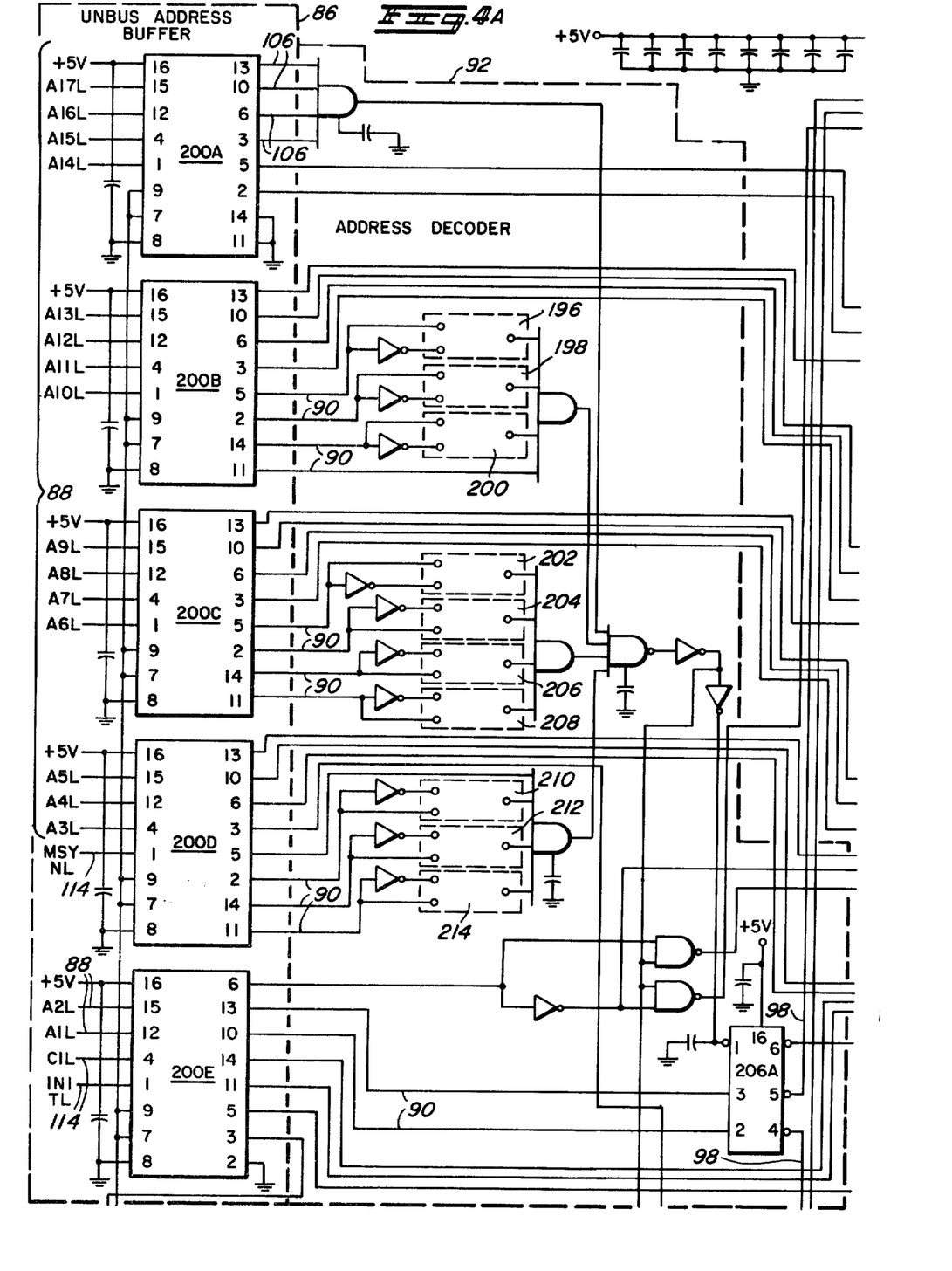
Figure 4B:
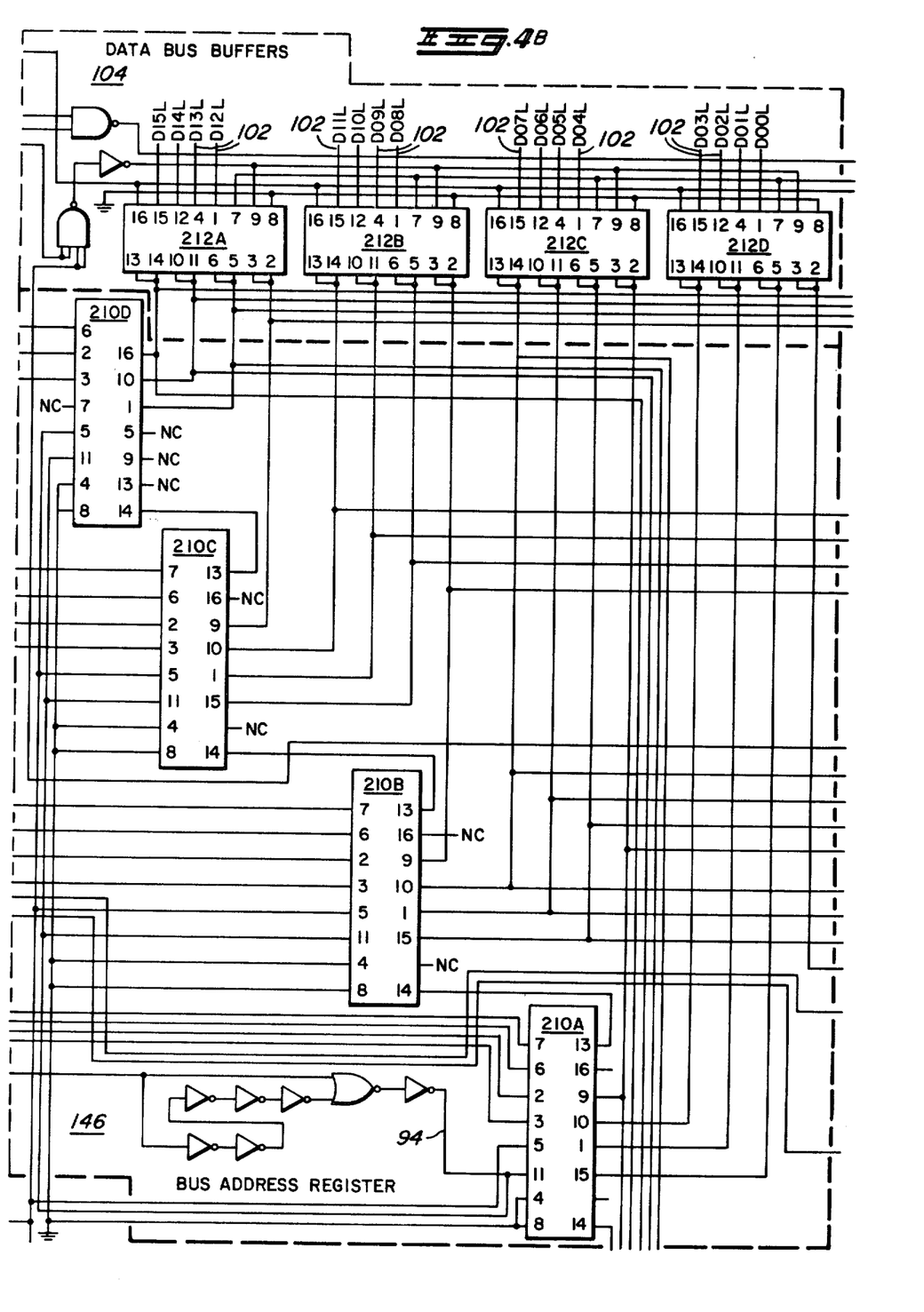
Figure 4C:
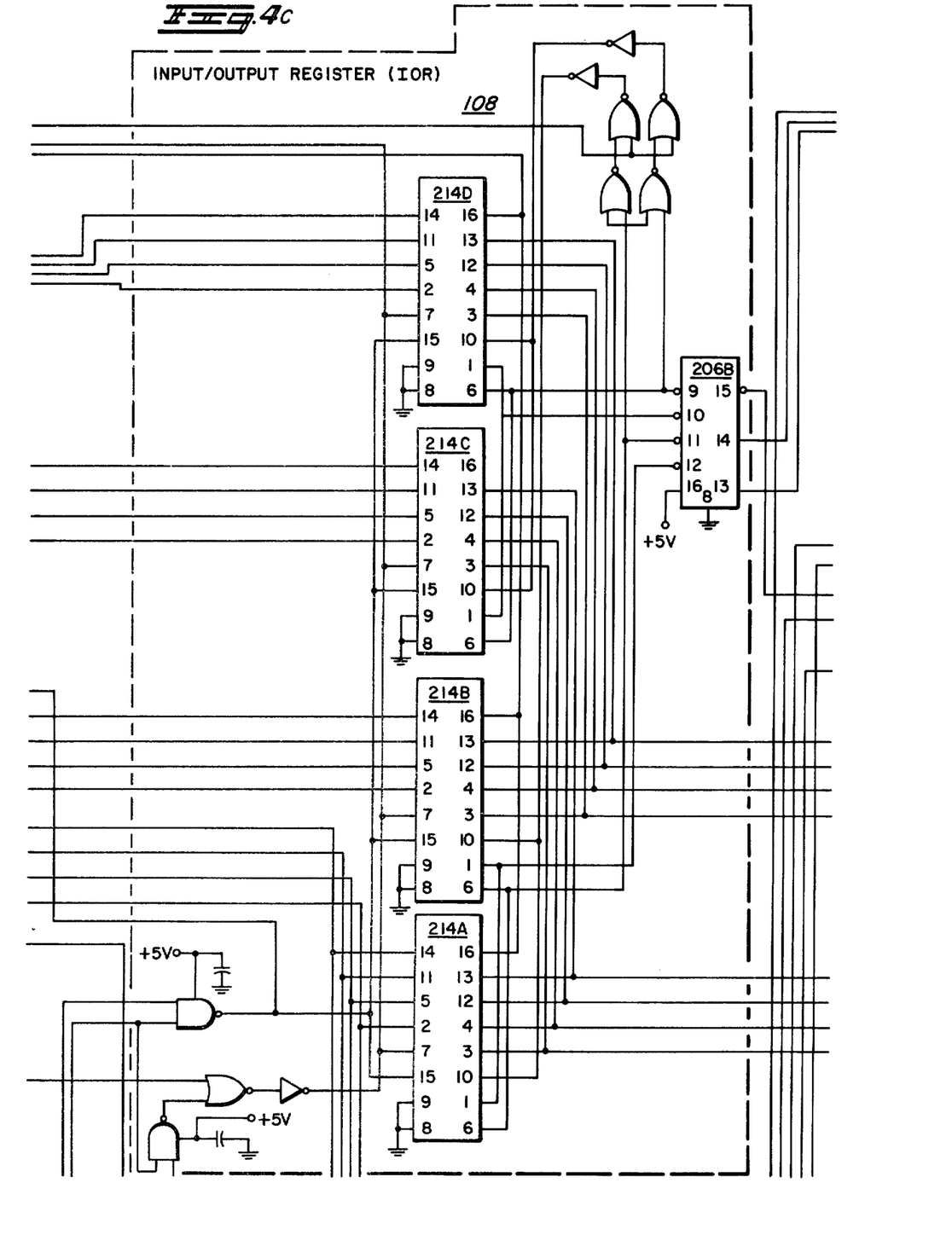
Figure 4D:
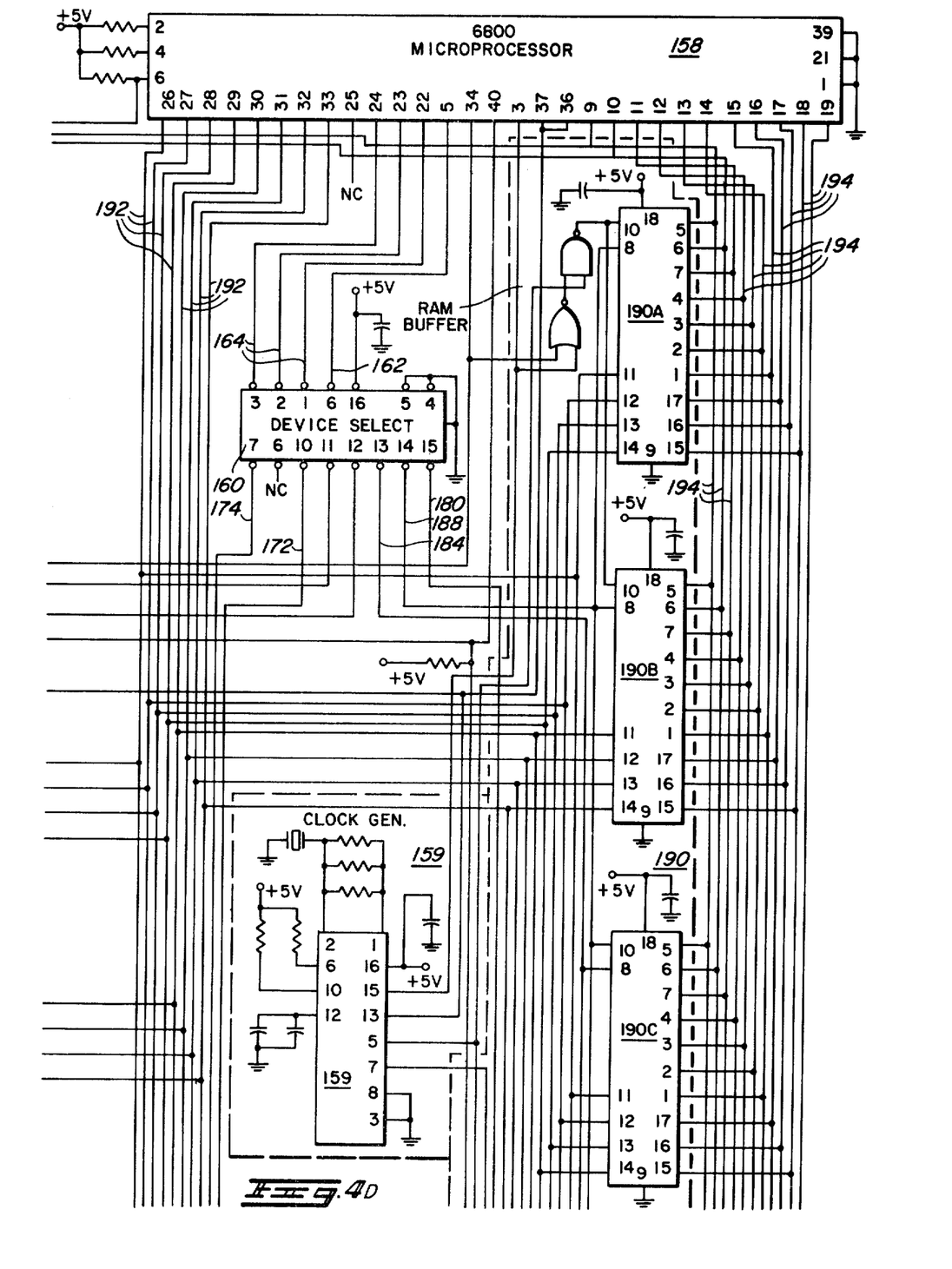
Figure 4E:
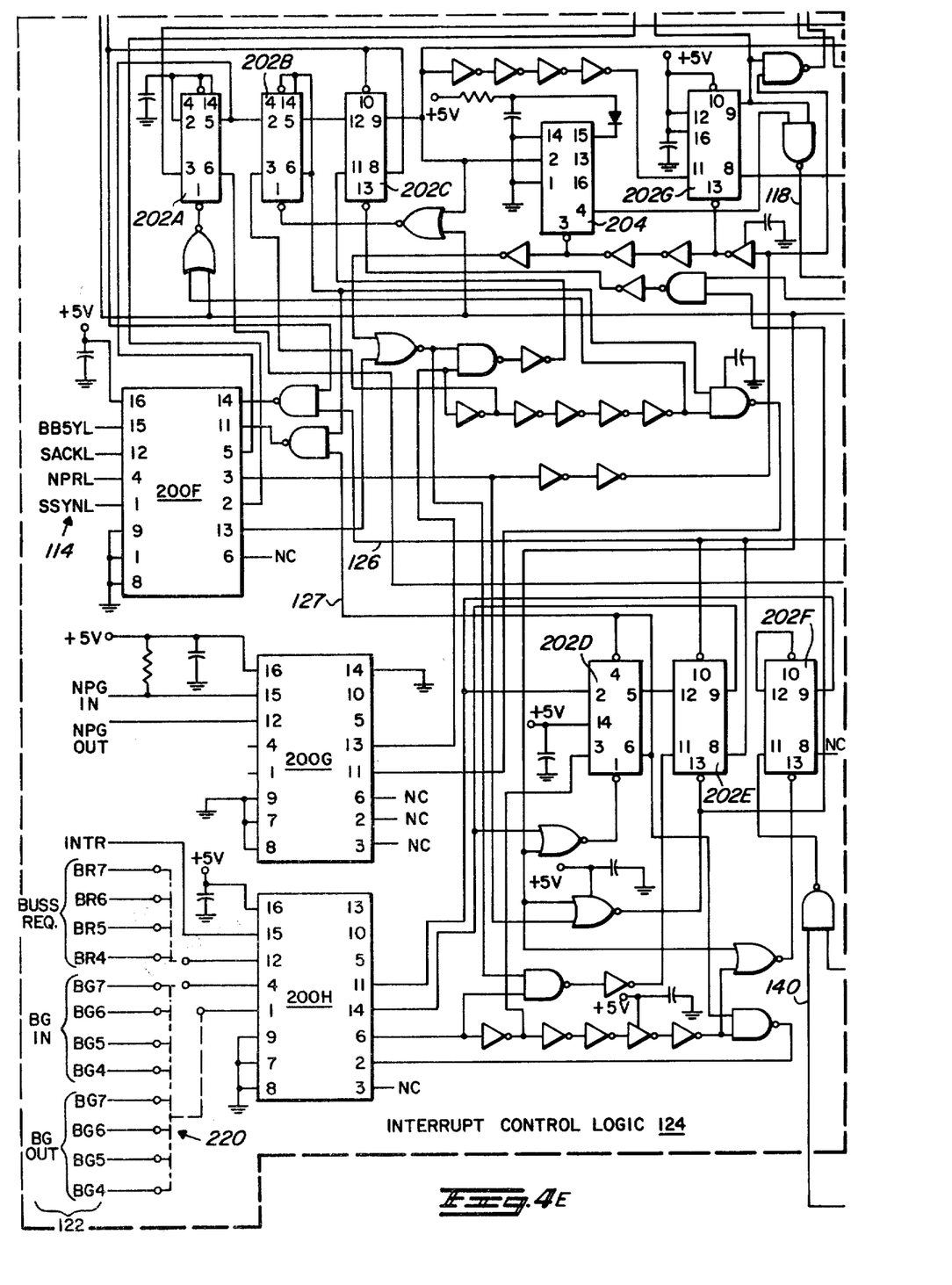
Figure 4F:
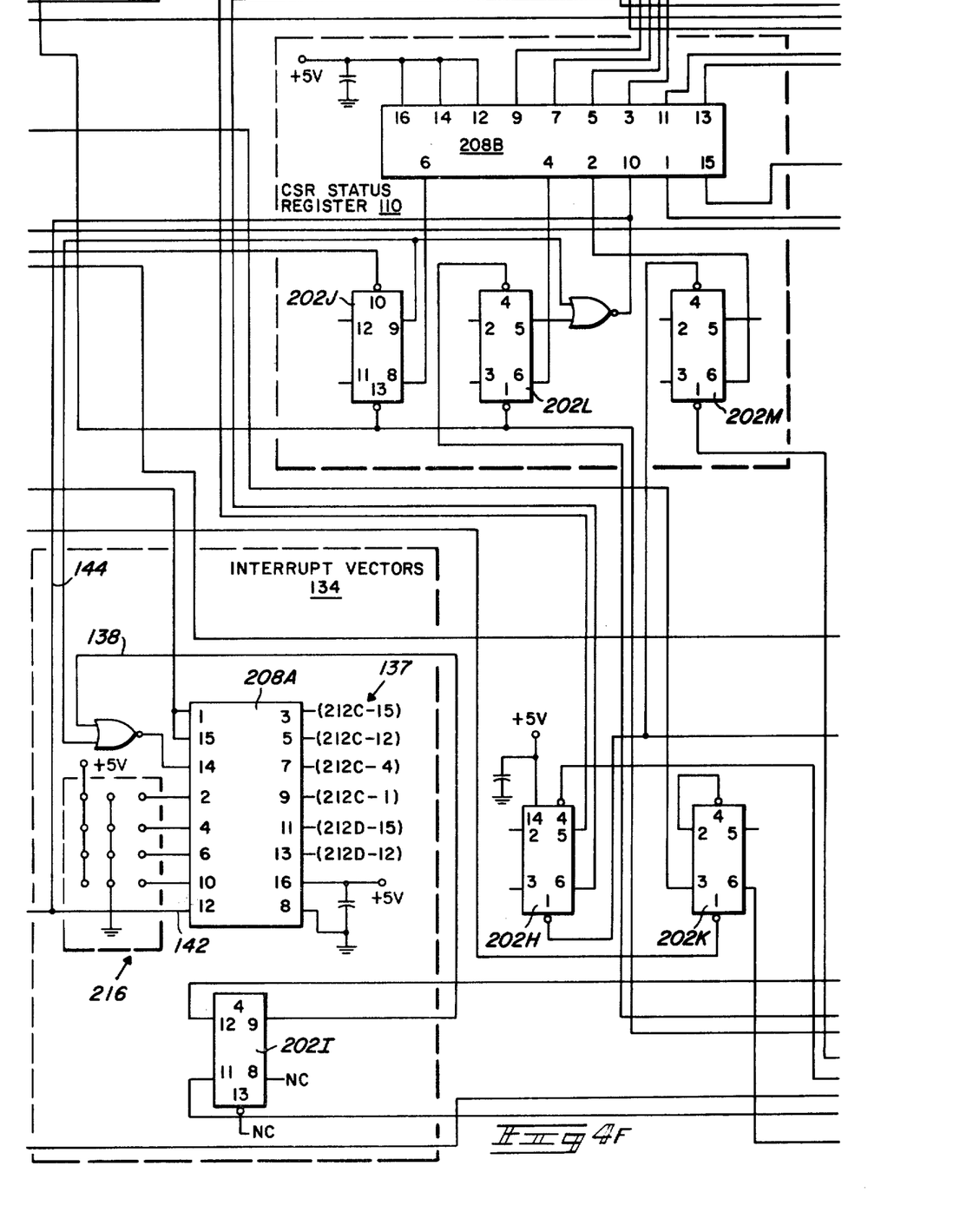
Figure 4G:
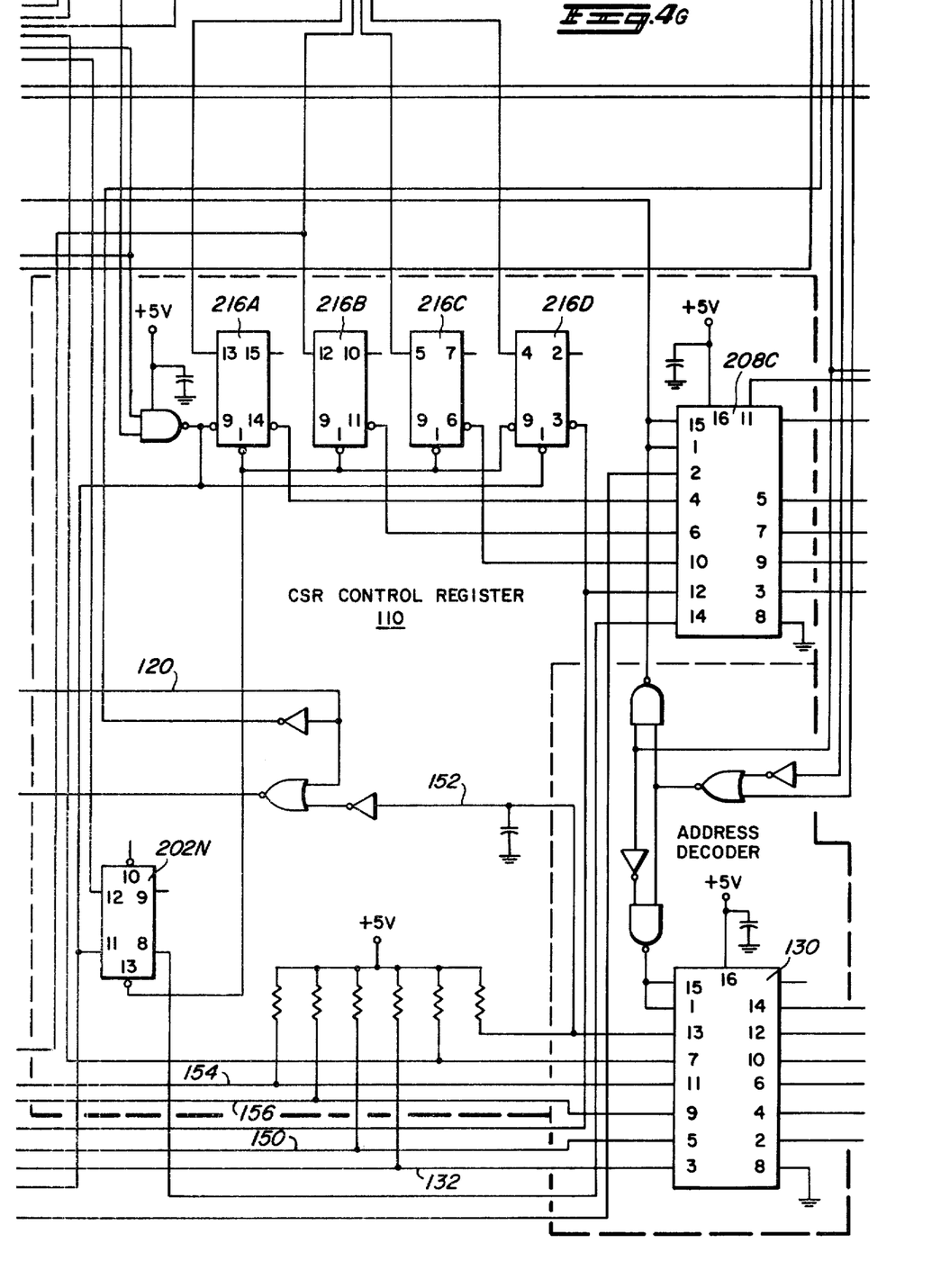
Figure 4H:
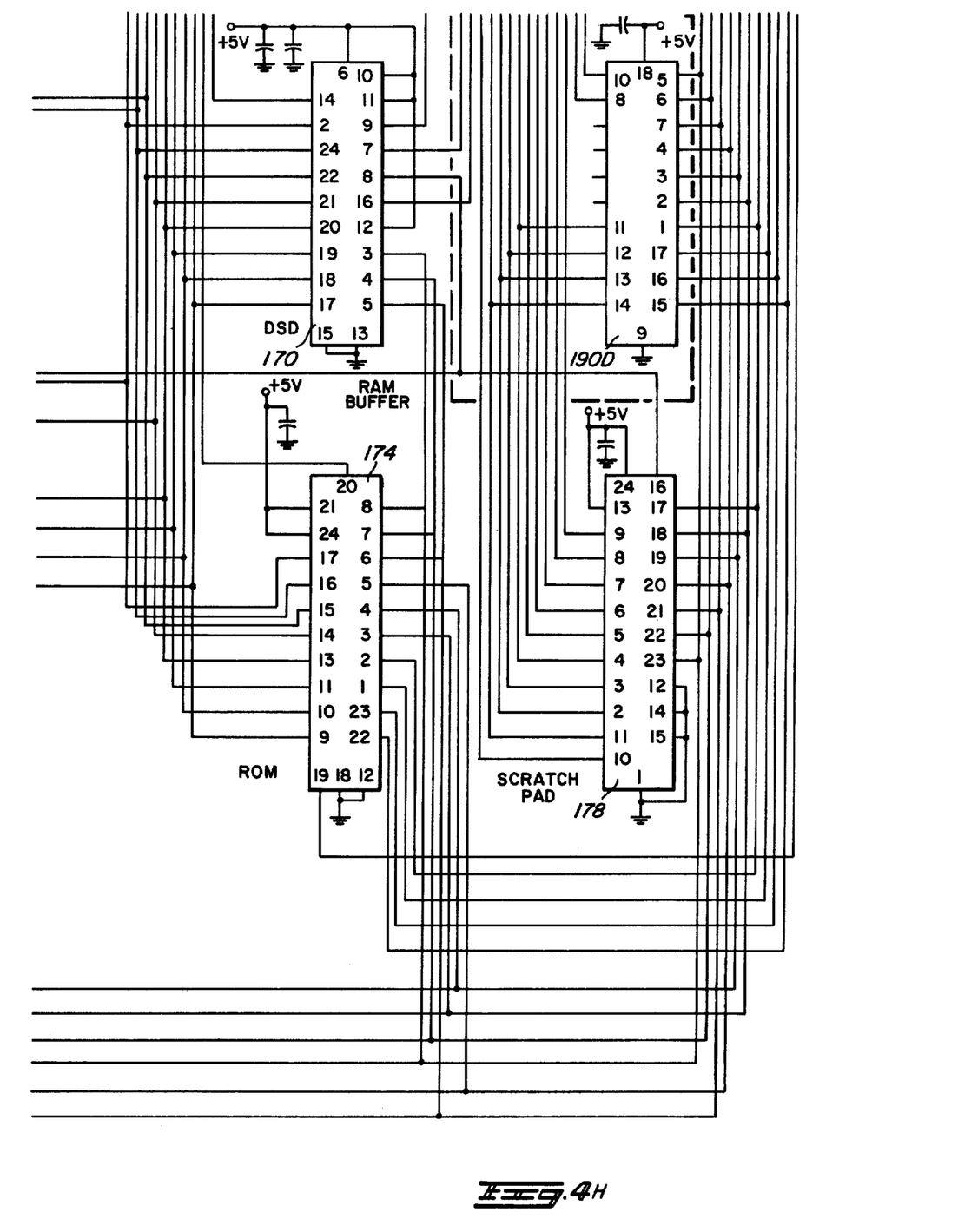

FIG. 3 is a block diagram of the data security module 84 of FIG. 2. The major interconnections between each of the blocks is shown in FIG. 4, but some connections considered to be less important and obvious are not included in order to simplify the drawing. Connected to the Unibus 76 is a Unibus address buffer 86 by seventeen address lines 88. Seventeen address lines out of the address buffer 86 are shown as line 90 and enter an address decoder 92 which provides three single output lines, a select BAR line 94, a select IOR line 96 and a select CSR line 98. Sixteen address lines, shown as line 100, in turn enter the address buffer 86. Also connected to the Unibus 76 are sixteen data lines 102 which are in turn connected to a data bus buffer 104. Sixteen bidirectional lines shown as line 106 couple the data bus buffer to an input/output register 108. Five of the lines of bus 106 are inputs to a CSR control register 110, four of the data lines carrying data to the data bus buffer 104 come from a CSR status register 112 and 15 of the lines 106 are inputs to the BAR. Six lines, shown as line 114, connect the Unibus 76 to a Unibus control logic 116. The Unibus control logic 116, which performs DMA transfers, is in turn connected to the CSR status register 112 by line 118 which is a slave sync time-out line. Line 120 also connects the Unibus control logic 116 to the CSR control register 110. 13 lines, shown as line 122, couple the Unibus 76 to an interrupt control logic 124. The interrupt control logic 124 is connected to the Unibus control logic 116 by data lines 126 and 128. The interrupt control logic 124 is also connected to an address decoder 130 by line 132, the set interrupt DMA finished or error line, and to an interrupt vector logic 134 by an enable vector line 136. The interrupt vector logic 134 has four output lines shown as line 137 which connect directly with the Unibus data lines. The CSR control register 110 is also connected to the interrupt control logic 134 by line 138 and is also connected to the interrupt control logic 124 by line 140. The CSR status register 112 is connected to the interrupt vector logic 134 by line 142, and is connected to the interrupt control logic 124 by line 144. A bus address register 146 is connected to the address decoder 92 through the select BAR line 94 and also to the Unibus address buffer 86 by the DMA address lines 100. The bus address register 146 is also connected to the Unibus control logic 116 by the D1 line (broken for clarity and convenience) 148. The bus address register 146 is connected to the address decoder 130 by the clock BAR line 149 (broken for clarity) and a BAR down control line 150 (broken for clarity), and the encrypt or decrypt finish line 152 (again broken for clarity). Encrypt or decrypt finish line 152 is also connected to the CSR status register 112 and to the CSR control register 110. A DSD key parity error appears at line 154 and connects the address decoder 130 to the CSR status register 112. A set DMA line 156 connects address decoder 130 to the Unibus control logic 116.

All of the logic circuits and interconnections described so far with regard to FIG. 3 are involved essentially with communicating with the PDP-11 Unibus. The rest of the circuits to be described below are primarily concerned with providing the data encryption standard algorithm function.

The heart of the data security module is a Motorola 6800 microprocessor 158 which is driven by clock generator 159 and in turn provides control and data transfers, and the exclusive OR function 54 and 68 of FIG. 1. Connected to the 6800 microprocessor 158 is a device selector 160 which is connected to the microprocessor by VMA line 162 and three address lines shown as line 164. Six lines going out from the device select 160 connect in turn to the CSR control register 110 via line 166, to the address decoder 130 via line 168, to a data security device 170 via line 172, to a program ROM 174 via line 176, to a scratch pad RAM 178 via line 180, and two lines 182 and 184 connect to the RAM storage 190. Line 182 addresses the upper section of RAM storage 190, and line 184 addresses the lower section of RAM storage 190. Also connected to the microprocessor 180 are eight data lines, shown as line 192, which couple data into and out of the microprocessor from and to the scratch pad RAM 178, from and to the RAM buffer 190, from and to the program ROM 174, from and to the data security device 170, and from the CSR control register 110. Sixteen address lines, shown as line 194, provide address data to the scratch pad RAM 178, the RAM buffer 190, the program ROM 174, the data security device 170, CSR control register 110, and the address decoder 130.

In use and in operation of the data security module, the PDP-11 computer must be first modified slightly by cutting the non-processed grant (NPG) line near the peripheral slot where the DSM is to be inserted. The cuttings are then in turn connected to pins CA1 and CB1 of the peripheral connector. This allows the data security module to utilize the non-process grant feature of the PDP-11. After this modification the board is slipped into the small peripheral controller (SPU) slot and normal computer operations can commence. The DSM has three registers for use in communicating with the PDP-11. The bus address register 146 keeps track of the address location of the data in the PDP-11 memory to be encrypted or decrypted. The IOR register 108 is used to hold data which is transferred between the PDP-11 and the encryption circuitry of the DSM. The control status registers CSR comprise a set of registers 112 and control register 110 and are used to signal control functions to the DSM by the PDP-11 and also to indicate the status of the DSM back to the PDP-11.

When the computer wishes to perform an encryption or decryption function, the processor first divides the data into 1 K by 16 bit blocks, and sets up memory locations for initial fill and major key. These locations may be used by the computer after the data has been loaded into the DSM. Note that the bus address register 146 and the input/output register (IOR) 108 and the CSR status register 112 each have a unique address which is selectable on the DSM board by wired jumpers and which will be described in connection with the detailed schematic of FIG. 4. The PDP-11 then using standard master slave techniques loads the address of the major key into the bus address register 146. The computer then loads bits 0 through 4 into the CSR status register 112 which tells the DSM the function to be performed. The functions available to the computer are shown in the table below:

| CONTROL FUNCTIONS | D4 | D3 | D2 | D1 | D0 (Go Bit) |
|---|---|---|---|---|---|
| Transfer Major Key to Active Key Reg. | 0 | 0 | 0 | 0 | 1 |
| Load Major Key | 0 | 0 | 0 | 1 | 1 |
| Load Secondary Key | 0 | 0 | 1 | 0 | 1 |
| Load Initial Fill | 0 | 0 | 1 | 1 | 1 |
| *Encrypt w/Initial Fill | 0 | 1 | 0 | 0 | 1 |
| Decrypt w/o Initial Fill | 0 | 1 | 0 | 1 | 1 |
| Decrypt w/Initial Fill | 0 | 1 | 1 | 0 | 1 |
| *Decrypt w/o Initial Fill | 0 | 1 | 1 | 1 | 1 |
| Encrypt Secondary Key | 1 | 0 | 0 | 0 | 1 |
| Decrypt Secondary Key | 1 | 0 | 0 | 1 | 1 |

*Will be used after the first block of data, if more than one block is to be encrypted or decrypted.

The D$_0$ bit is a go bit which tells the DSM to perform the function set in the status register. At this point microprocessor 158 takes over and initiates a direct memory access (DMA) routine using the Non-Process Grant line to request control of the Unibus. This signal is fed to the Unibus control logic 116 from the microprocessor 158 through the device select 160 via lines 168 and 194 to the address decoder 130 which in turn impresses a DMA signal on the line 156 to initiate the DMA routine. The $C_1$ bit of line 148 in the bus address register 146 is sent to the unibus control logic 116 to indicate that a data in function is to occur during the DMA cycle. Note that since the DSM operates only with full 16 bit words, the $C_0$ line as defined in the PDP-11 literature is not used by the DSM and so floats to high voltage or PDP-11 logic "0" level. After the first two bytes addressed by the first DMA cycle and received in the input/output register 108, the DSM releases control of the Unibus, increments the bus address register 146 using the clock BAR line 148, and again performs a DMA to bring in two more bytes of the major key. Since the major key requires four memory addresses to provide the 56 bits, the 6800 performs four DMA operations incrementing the bus address register 146 between each operation. Each of the two bytes that are brought into the input/output register 108 are transferred directly to the data security device 170, and the data security device 170 is programmed by the microprocessor to accept these bits as major key bits. The operation of the data security device 170 is described in copending application entitled "Data Security Device", filed on even date herewith and bearing Ser. No. 914,831. It should be understood that the keyed data entering into the DSM is placed directly into the data security device 170 and is not accessable, after it is entered in the DSD 170, to any outside intrusion other than physical probing of the die. The DSM retains the key for use in encrytion and is for all practical purposes inaccessible to anyone. After the last data of the major key has been loaded, the microprocessor sets bit 7 of the control status register 112 to indicate to the computer that the DSM is ready for further commands.

During the loading of the key into the data security device, the DSD 170 checks parity of the key. If a parity error is detected, a flag is set which the microprocessor detects and in turns transmitts through the device select 160 and the address decoder 130 onto the DSD key parity line 154 and into the CSR status register 112 where bits 13 and 15 are set to indicate a parity error in loading the key has occurred. Bit 13 of the CSR indicates a parity error has occurred and bit 15 is a logical OR of bit 13 and bit 14. Bit 14 is used to indicate that a time-out error has occurred when the DSM has assumed master control of the Unibus. This slave sync time out error originates in the Unibus control logic 116 and is transferred via line 118 to the CSR status register 112.

Next the computer will load the initial fill buffer of the DSM by placing the address of the first word of the initial fill into the bus address register 146 and then commanding the CSR control register 110 to read in the initial fill. Again since the initial fill is 64 bits long, the 6800 microprocessor 158 reads four memory addresses using the DAM format, places the initial fill on the scratch pad RAM 178 and sets the ready bit in the CSR status register 112 to a logical 1. Next the computer will load the bus address register 146 with the address of the first word of the block of data to be enciphered, place the word count of the block of data to be enciphered into the input/output register 108 and then write into the CSR control register 110 the code for encrypt with initial fill control word. At this point the MC6800 microprocessor 158 will take control. The microprocessor will use a DMA operation to bring the first block of data the RAM storage 190, transfer the first 64 bits of the initial fill from the scratch pad RAM 178 into the data security device 170, and perform an encryption of the initial fill. Microprocessor 158 then performs an Exclusive-OR operation on the first 8 bits from the data security device with the first 8 bits from the first memory location using software techniques to provide the first 8 bits (1 byte) of ciphered text. These first byte of ciphered test is loaded into the RAM storage 190 and also into the bottom of the scratch pad RAM 178. The 8 bits at the top (oldest byte) of the RAM storage 190 is discarded. The new initial fill in the scratch pad RAM 178 is loaded into the data security device 170 for enciphering and the first 8 bits out of the DSD 170 are used to exclusive-OR with the next 8 bits from the data memory. The microprocessor 158 keeps track of the address in bus address register 146 as it is being incremented by referring to the word count which in turn has been stored along with the initial fill in the scratch pad RAM 178. The microprocessor 158 continues encrypting until all the data block has been encrypted. After the last data byte has been encrypted, stored in the RAM storage 150, and a read data command is received, the microprocessor 158 then sets the BAR down control and proceeds to replace the data back into the computer memory by placing the bus address register contents onto the Unibus address line and using the IOR 108 to place the most recently enciphered data bytes onto the data bus line during a DMA cycle to place the last two encrypted data bytes into the upper most memory location of the PDP-11. After each DMA cycle, the bus address register 146 is decremented using the clock BAR signal on line 148 to enter the next to last crypted data bytes into the PDP-11 memory. The PDP-11 memory now contains the exact contents prior to the encryption but in an encrypted form rather than in plain text. Then in the conventional manner the interrupt logic is read by the processor and is thereby informed that a encryption has been completed. At this point the microprocessor via the device select 160 and the address decoder 130 sends a set interrupt signal via line 132 to the interrupt control logic 124. The interrupt control logic 124 sets an enable vector 136 into the interrupt vector logic 134 which in turn selects the vector appropriate to this interrupt and onto the data lines via line 135 once bus grant has been received from the PDP-11. The vector locations are programmable on the board using wire jumpers in a manner similar to the address decoder selection as will be further discussed with regard to FIG. 5. The interrupt control logic 124 senses a slave sync clear from the Unibus control logic 116 via lines 128 and sends a bus grant request via one line of bus 122. Upon receipt of the bus grant from the PDP-11, interrupt control logic 124 sends a command to the Unibus control logic 116 via line 126 to assert the bus busy signal onto the Unibus.

At this point the processor may continue the second block of data to be encrypted without initial fill by choosing the appropriate control bits to be fed into the CSR control register 110. The decryption operation is performed in analogous manner. It should also be noted that although the term encryption is used generally to refer to encrypting plain text or ciphered text and decryption used for converting ciphered text or plain text, the alogrithms are interchangeable and one could use a decryption alogrithm to perform an encryption of data which in turn would have to be returned to plain text using the encryption alogrithm.

The data security device 170 also has the capability of storing a major key while utilizing an active key which can be different than the major key. When the major key is loaded into the data security device 170 as in the example above, it is loaded into both the active key register and the major key register. Another command can be given to the DSM which will load the active key only and not affect the major key. Another command can be given which will transfer the content of the major key to the active key register. Another capability of the data security module is the ability to encrypt 64 bits of data and place encrypted data directly into the active key register as is more fully explained in the aforementioned co-pending application. It is also possible to perform a decrypt operation on this data and place it in the active key register. The advantage of this operation is more fully described in the aforementioned co-pending application.

The MC6800 microprocessor 158 is controlled by a program ROM 174.

FIG. 4 is a detailed schematic of the data security module. No attempt will be made to describe in detail the operation of each logic element as logic presented together with a discussion of the block diagram will make the operation of the circuitry readily understandable to those skilled in the art. The control circuitry and logic pertains almost exclusively to interfacing with the PDP-11 computer and such circuitry is believed common in the art. The blocks of FIG. 3 have been identified in FIG. 4 with corresponding reference numbers as have the interconnect lines of FIG. 3 been identified in FIG. 4. The address decode logic on board selection is shown in areas 196, 198, 200, 202, 204, 206, 208, 210, 212, and 214. Selection of the proper jumper for its desired address location is readily apparent from the schematic diagram. Also the selection of the interrupt vectors as shown in area 216 is accomplished with wired jumpers and again readily apparent from the schematic. The selection of bus request, bus-grant-in, and bus-grant-out is by wire jumper in area 220. The nonselected bus-grant-in lines must be jumpered to the corresponding bus-grant-out lines to provide continuity in the Unibus. All of the devices with exception of the data security device 170 are common commercial devices. The common AND gates are 54SLS00, the inverters are 54LS04's, the two input NOR gates are 54LS02's, the four input AND gates are 54LS21's. The other device types are shown in the table below.

| Device | Part No. | Manufacturer |
|---|---|---|
| 158 | MC6800 | Motorola |

| Device | Part No. | Manufacturer |
|---|---|---|
| 159 | MC6875 | Motorola |
| 160 | 74LS138 | Motorola |
| 170 | MGD68NE | Motorola |
| 174 | B2716 | Intel |
| 178 | MCM6810A | Motorola |
| 190 A-D | C2114 | Intel |
| 200 A-H | MC3438 | Motorola |
| 202 A-N | MC74LS74 | Motorola |
| 204 | MC74LS123 | Motorola |
| 206 A&B | MC74LS139 | Motorola |
| 208 A-C | MC74LS368 | Motorola |
| 210 A-D | MC74LS191 | Motorola |
| 212 A-D | DS8835 | National |
| 214 A-D | DM8542 | National |
| 216 A-D | MC74LS175 | Motorola |

While the invention has been particularly shown and described with reference to the preferred embodiment shown, it will be understood by those skilled in the art that various changes may be made therein without departing from the teaching of the invention. Therefore, it is intended in the appended claims to cover all such equivalent variations that come within the scope and spirit of the invention.

What is claimed is:

1. A data security module comprising:
   (a) address buffer means connected to address lines of a computer for transmitting and receiving addresses from and to said computer;
   (b) address decoder means connected to said address buffer means for decoding an address received by said address buffer and providing command words in response thereto;
   (c) data buffer means connected to data lines of said computer for receiving and transmitting data from and to said computer;
   (d) microprocessor means for providing control of data flow in and out of the data security module and for performing a portion of the data encryption alogrithm, and operating in response to said command words;
   (e) memory means coupled to said microprocessor means for holding data words used in the encryption process;
   (f) data security device means connected to said microprocessor means for performing a basic cipher alogrithm;
   (g) interrupt and control means connected to control lines of said computer and to said microprocessor means for receiving control signals from said computer, decoding said control signals and returning appropriate control signals to said computer and signalling reception of said control signals to said microprocessor, and sending control signals to said computer in response to commands from said microprocessor.

* * * * *